United States Patent [19]

Tazewell

[11] Patent Number: 4,774,313
[45] Date of Patent: Sep. 27, 1988

[54] POLYURETHANES HAVING IMPROVED CRACK GROWTH RESISTANCE

[75] Inventor: Joseph H. Tazewell, Akron, Ohio

[73] Assignee: The Firestone Tire & Rubber Company, Akron, Ohio

[21] Appl. No.: 122,718

[22] Filed: Nov. 18, 1987

[51] Int. Cl.$^4$ ............................................. C08G 18/10
[52] U.S. Cl. ...................................... 528/52; 528/60; 528/63; 528/64; 521/914
[58] Field of Search .................. 528/52, 60, 63, 64; 521/914

[56] References Cited

U.S. PATENT DOCUMENTS 4,046,743  9/1977  Schonfeld ................... 260/77.5 AB

OTHER PUBLICATIONS

Dupont Adiprene Urethane Rubber Brochure, AP-720.21, 1981.

*Primary Examiner*—Maurice J. Welsh
*Attorney, Agent, or Firm*—Daniel N. Hall

[57] ABSTRACT

Improved crack growth resistance is obtained when glycerine is added to a non-cured urethane prepolymer system containing free NCO groups therein and cured with a metal halide salt complex of methylenedianiline. The prepolymer is made from a blend of a polyether polyol and a polyether intermediate having ethylene oxide end blocks thereon.

19 Claims, No Drawings

POLYURETHANES HAVING IMPROVED CRACK GROWTH RESISTANCE

FIELD OF THE INVENTION

The present invention relates to improving the crack growth resistance of various urethane compounds. More specifically, the present invention relates to utilizing glycerine in methylenedianiline salt complex cures of prepolymers made from blends of polyether polyols.

BACKGROUND

Heretofore, various additives or methods of preparation have been utilized to improve the crack growth resistance of specific types of urethanes. However, with regard to urethane prepolymers made from polypropylene glycol reacted with MDI and cured with metal halide salt complexes of methylenedianiline, good crack growth resistance was generally not known or was unavailable.

U.S. Pat. No. 4,046,743 to Schonfeld relates to amine curable polymers or prepolymers cured with a methylenedianiline complex in the presence of a high dielectric constant catalytic compound which is relatively non-reactive with amines and isocyanates whereby increased cure rates and/or decreased cure temperatures are obtained. Examples of such high dielectric constant compounds include oleic acid, glycerin, tributyl phosphate, and the like. The urethane prepolymer is made by the reaction of a polyether, a polyol, a polyester polyol, polybutadiene diols, or combinations thereof with a polyisocyanate. This patent does not relate to blends of polyether intermediates wherein one of the polyether intermediates has ethylene oxide units therein, or to cure of MDI terminated prepolymers metal halide salt complexes of methylenedianiline in the presence of glycerine.

A brochure by DuPont "Adiprene Urethane Rubber", AP-720.21 Caytur 21, page 6, states that a method for obtaining satisfactory cure in thick sections of polymers containing high NCO content is to add a catalyst, such as glycerol, which reduces the unblocking temperature of Caytur 21. However, the prepolymer relates to Adiprene L-315 and L-767 which are polytetrahydrofuran prepolymers terminated with toluene diisocyanate. Thus, it does not contain a polyether intermediate having ethylene oxide units therein, or to cure with MDI terminated prepolymers with metal halide salt complexes of methylenedianiline in the presence of glycerine.

SUMMARY OF THE INVENTION

It is therefore an aspect of the present invention to provide improved resistance to crack growth in blends of polyether polyol intermediates containing ethylene oxide end blocks with the blend being reacted with an aromatic polyisocyanate and cured with salt complexes of MDA in the presence of small amounts of glycerine.

It is a further aspect of the present invention to provide improved crack growth resistance to the above urethane polymers by adding the glycerine to a liquid reaction mixture of the urethane prepolymer.

These and other aspects of the present invention will become apparent from the following detailed specification.

In general, a polyurethane having improved resistance to crack growth comprises, a cured polyurethane, said cured polyurethane made from a prepolymer and a metal halide salt complex of methylenedialine in the presence of an effective amount of glycerine, said prepolymer having at least 2.0% of free NCO groups therein based upon the weight of said prepolymer, said prepolymer made by reacting an aromatic diisocyanate such as a diphenyl diisocyanate, a para-phenylene diisocyanate, or diphenylmethane diisocyanate, with a blend of an effective amount of (a) a poly(oxyalkylene) diol or triol and (b) a poly(oxyalkylene) diol or triol having ethylene oxide end blocks, said alkylene group of said poly(oxyalkylene) having from 3 to 6 carbon atoms.

DETAILED DESORIPTION OF THE INVENTION

According to the concepts of the present invention, a blend of polyether polyols are utilized as intermediates in forming polyurethanes having improved crack resistant properties. One type of polyether utilized is a homopolymer such as a poly(oxyalkylene) polyol. As known to the art and to the literature, these polyols are made from polyhydric alcohol initiators having from 2 to about 6 carbon atoms or water with various oxiranes containing 8 or more carbon atoms. The end result is a hydroxyl terminated poly(oxyalkylene) polyol. The polyhydric alcohol contains from 2 to about 6 hydroxyl groups with 2 or 8 hydroxyl groups (that is a diol or a triol) being preferred. Suitable polyhydric alcohol initiators include ethylene glycol, propylene glycol, glycerin, pentaerythritol, arabitol, sorbitol, and the like. The poly(oxyalkylene) groups are generally derived from alkyl substituted oxiranes and contain a total of 3 to about 6 carbon atoms therein with 6 carbon atoms being preferred, that is poly(oxypropylene) diol or triol with diol being preferred. Examples of suitable oxiranes include propylene oxide, butylene oxide, and the like.

Another type of polyether utilized in the blend is a copolymer such as a polyether intermediate containing ethylene oxide end blocks thereon. In other words, ethylene oxide is incorporated onto the second or remaining polyether polyol Such ethylene oxide blocked polyols have been found to have a catalytic effect on metal halide salt complexes of MDA. The polyether intermediate is a polyether polyol as set forth hereinabove and thus is hereby incorporated by reference except that it also contains ethylene oxide end blocks thereon. That is, the polyether polyols have alkyl substituted oxyethylene repeating units therein with the alkyl group having from 1 to 4 carbon atoms and also contains ethylene oxide end blocks. Addition of excessive ethylene oxide is avoided since excessive ethylene oxide causes changes in various properties such as increased sensitivity to water and increased glass transition temperatures. Too little ethylene oxide is ineffective in catalyzing the release of the active ingredient of the salt complex of MDA. Generally, a suitable number of ethylene oxide units in the end block is from about 1 to about 20, and desirably from about 4 to about 10 units. Thus, of the large number of individual intermediate molecules prepared, the ethylene oxide end caps, on the average, will have at least 1 to a maximum of approximately 20 repeating ethylene oxide units therein.

The amount of ethylene oxide contained therein is generally from about 2% to about 60% by weight, desirably from about 8% to about 25%, and preferably from about 12% to about 20% by weight based upon the total weight of the end capped poly(oxyalkylene) polyol. Examples of specific ethylene oxide end capped polyethers include the various Voranol compounds produced by Dow Chemical Co., such as for example Voranol 4702, Voranol 4815, Voranol 5287, and the like. According to the present invention, ethylene oxide end capped polyether triols are preferred such as Voranol 4702. The ethylene oxide containing polyether intermediates of the present invention generally have an equivalent weight of from about 200 to about 8,000 desirably from about 20 to about 4,000 and preferably from about 500 to about 3,600.

In order to obtain suitable results in the present invention, a blend of polyethers, that is the polyether polyol and the ethylene oxide end capped polyether polyol are utilized. That is, the amount of the ethylene oxide containing polyether is from about 3% to about 10% by weight and preferably from about 40% to about 70% by weight based upon the total weight of the various polyethers. Thus, the amount of the poly(oxyalkylene) polyol is from about 10% to about 70% by weight, and preferably from about 30% to about 60% by weight based upon the total weight of the various polyethers. According to the present invention, it has been found that ethylene oxide end capped polyether prepolymers must be utilized to yield suitable properties in that the poly(oxyalkylene) polyol prepolymers generally tend to have poor properties inasmuch as they are not readily cured with MDA salt complexes.

The blend of the polyether intermediates of the present invention are reacted with an aromatic polyisocyanate to form the prepolymer. Examples of aromatic polyisocyanates include the 4,4'-diphenyl diisocyanates, para-phenylene diisocyanate, and MDI, that is 4,4'-diphenylmethane diisocyanate. MDI is preferred.

According to the present invention, it has been found that high amounts of free NCO end groups are desired inasmuch as they produce hard segments and thus result in improved properties. Thus, the amount of polyisocyanate utilized is such that the amount of free NCO groups is at least 2.0 weight percent, desirably at least 5 weight percent, and preferably at least 7 weight percent based upon the total weight of the prepolymer. The reaction between the various polyether polyols and the polyisocyanates are known to the art as well as to the literature. Suitable reaction temperatures are thus from about ambient to about 100° C., desirably from about 40° C. to about 90° C., and preferably from about 60° 0 to about 70° C.

It is an important aspect of the present invention to mix a crack growth resistant agent such as glycerine with the prepolymer containing ethylene oxide blocks before cure thereof with a metal halide salt complex of MDA. An effective amount of crack growth resistant agent is utilized to improve crack growth resistance of the cured urethane polymer. An effective amount of the agent such as glycerine is generally from about 0.05 to about 0.75, desirably from about 0.1 to about 0.4, and preferably from about 0.2 to about 0.3 parts by weight based upon 100 parts by weight of the prepolymer.

The prepolymers of the present invention are cured with a metal halide salt complex of MDA, that is 4,4'-methylene dianiline. Various salt complexes of MDA can be utilized such as with sodium chloride, sodium bromide, sodium iodide, sodium nitrite, lithium chloride, lithium bromide, lithium iodide, lithium nitrite, and sodium cyanide with sodium chloride being preferred. A description of MDA and the various salt complexes thereof which can be utilized in the present invention as set forth in U.S. Pat. No. 3,755,261 to Van Gulick are hereby fully incorporated by reference. Cure of the prepolymer generally takes place at a temperature of from about 100° C. to about 170° C., and preferably from about 120° C. to about 150° C. under anhydrous conditions.

When glycerine is utilized in concert with the prepolymer blend including the ethylene oxide containing polyether, an unexpectant improvement in crack growth resistance is obtained. Accordingly, the compositions of the present invention can be used in tires, drive belts, and other dynamic applications.

The invention will be better understood by reference to the following example:

EXAMPLE

Preparation of EO Block Triol/Diol/MDI Prepolymer

Into a 5000 ml three necked, round bottom flask, equipped with stirrer, pressure equilibrating dropping funnel, thermometer, nitrogen bubbler and heating mantle, was weighed 654.2g of molten 4,4-diphenylmethane diisocyanate (MDI) (Isonate 125M, product of Dow Chemical Corp.), maintained at 70° C. While maintaining a blanket of dry nitrogen in the reaction vessel, 1745.8g of a 57.7/42.8 wt./wt. dry blend of 5000MW ethylene oxide end blocked polypropylene oxide triol (Voranol 4702) and 2000MW polypropylene oxide diol (Voranol 2120, product of The Dow Chemical Company) (43.4 blend hydroxyl number) was added dropwise to the stirred MDI, at a rate so as not to exceed 75° C. The reaction mixture was stirred and maintained at 70° C. for two hours after all of the polyol had been added. The prepolymer was then held under about 1.0 mm Hg pressure, with stirring, for two additional hours. The resultant prepolymer had a free isocyanate content of 6.44.

Cure of EO Block Triol/Diol/MDI/Caytur-21, Without Glycerine

Into a dry 500 ml, three necked, round bottom flask, equipped with stirrer, thermometer, heating mantle, nitrogen bubbler and vacuum, was weighed 187.2g of the above EO block triol/diol/MDI prepolymer (6.44% NCO). To the homogeneously mixed and stirred prepolymer, under a dry nitrogen blanket, was added from a tared syringe 62.3g of a 50/50 dispersion of methylenedianiline-sodium chloride complex (3MDA-NaCl) in dioctyl phthalate carrier (Caytur-21, product of E. I. du Pont de Nemours) Vacuum of about 1.0 mm Hg was applied gradually and the mixture temperature was raised to 40° C., over a period of 20 minutes. Vacuum was broken with nitrogen and the mixture was cast into a mold, preheated to 135° C., and then cured in a hydraulic laboratory press at 135° C. for 60 minutes.

Cure of EO Block Triol/Diol/MDI/Caytur-21, With Glycerine

The above procedure was repeated except that 0.5g of glycerine was added to the stirred reaction mixture at the end of twenty minutes. Stirring of the reaction mixture, under vacuum, was continued for an additional 5 minutes. Vacuum was then broken with nitrogen and the mixture was cast into a mold, preheated to 135° C., and then cured in a hydraulic laboratory press at 135° C. for 60 minutes.

|  | WITHOUT GLYCERINE | WITH GLYCERINE |
|---|---|---|
| PROPERTIES @ 23° C. | | |
| Shore "A" | 93 | 94 |
| $M_S$, psi | 420 | 360 |
| $T_B$, psi | 2454 | 2215 |
| $E_B$, % | 399 | 396 |
| Crack Propagation Cycles to failure - ASTM D-813 | 2769 | 4642 |
| PROPERTIES @ 100° C. | | |
| $M_S$, psi | 350 | 325 |
| $T_B$, psi | 1542 | 1478 |
| $E_B$, % | 299 | 312 |

As is seen, a significant improvement in resistance to crack growth occurs without much change in other properties when glycerine is utilized.

While in accordance with the patent statutes, a best mode and preferred embodiment have been set forth, the scope of the present invention is not limited thereto, but rather by the scope of the attached claims.

What is claimed is:

1. A polyurethane having improved resistance to crack growth comprising:
    a cured polyurethane, said cured polyurethane made from a polyether prepolymer and a metal halide salt complex of methylenedianiline in the presence of an effective amount of glycerine,
    said prepolymer having at least 2.0% of free NCO groups therein based upon the weight of said prepolymer,
    said prepolymer made from a diphenyl diisocyanate, a phenylene diisocyanate, or diphenylmethane diisocyanate, and a blend of an effective amount of (a) a polyether diol or triol and (b) a poly(oxyalkylene) diol or triol having ethylene oxide end blocks, 2. A polyurethane according to claim 1, wherein said (a) oxyalkylene group is an alkyl substituted oxyethylene unit, wherein said alkyl substituent has from 1 to 4 carbon atoms, wherein said (b) ethylene oxide end blocked polyether ether diol or triol contains alkyl substituted oxyethylene repeating units therein and wherein said alkyl substituent contains from 1 to 4 carbon atoms, wherein said (b) ethylene oxide containing polyether diol or triol has from about 2% to about 60% by weight of ethylene oxide therein based upon the total weight of said (b) polyether diol or triol, and wherein the amount of said glycerine is from about 0.05 parts to about 0.75 parts by weight based upon 100 parts by weight of said prepolymer.

3. A polyurethane according to claim 2, wherein the amount of said (a) poly(oxyalkylene) diol or triol is from about 10% to about 70% by weight based upon the total weight of said (a) poly(oxyalkylene) diol or trio and said (b) polyether diol or triol, wherein the amount of said (b) polyether diol or triol containing ethylene oxide end blocks is from about 30% to about 90% by weight based upon the total weight of said (a) poly(oxyalkylene) diol or triol and said (b) polyether diol or triol.

4. A polyurethane according to claim 3, wherein the equivalent weight of said (a) poly(oxyalkylene) diol or triol and said (b) ethylene oxide containing polyether diol or triol is from about 200 to about 8,000, wherein the amount of said free NCO is at least 5% or greater, and wherein the amount of said glycerine is from about 0.1 parts to about 0.4 parts by weight.

5. A polyurethane according to claim 4, wherein the amount of said (a) poly(oxyalkylene) diol or triol is from about 30% to about 60% by weight, wherein the amount of said (b) ethylene oxide blocked polyether diol or triol is from about 40% to about 70% by weight, wherein said polyisocyanate is diphenylmethane diisocyanate, and wherein said prepolymer contains at least 7% by weight of free polyisocyanate based upon the weight of said prepolymer.

6. A polyurethane according to claim 5, wherein said alkyl substituent of said oxyethylene repeating units is methyl with regard to both said (a) poly(oxyalkylene) diol to trio and said (b) polyether diol or triol, wherein said equivalent weight of said (a) poly(oxyalkylene) diol or triol and said (b) polyether diol or triol is from about 500 to about 3,600, wherein said metal halide salt complex is sodium chloride, and wherein the amount of said glycerine is from about 0.2 to about 0.3 parts by weight.

7. A polyurethane according to claim 5, wherein said (a) poly(oxyalkylene) diol or triol is poly(oxypropylene)diol, wherein said (b) ethylene oxide blocked polyether diol or triol is poly(oxypropylene)diol and wherein the average number of said ethylene oxide repeat units of each said end block is from 1 to about 20.

8. A polyurethane according to claim 6, wherein said (a) poly(oxyalkylene) diol or triol is poly(oxypropylene)diol, wherein said (b) ethylene oxide containing polyether diol or triol is poly(oxypropylene)diol and wherein the average number of said ethylene oxide units in each said end block is from about 4 to about 10.

9. A tire containing the composition of claim 4.

10. A tire containing the composition of claim 6.

11. A methylenedianiline complex cured polyurethane comprising:
    a cured polyurethane, said polyurethane cured by reacting a prepolymer having at least 2% by weight of free NCO groups therein based upon the total weight of the prepolymer with a metal halide salt complex of methylenedianiline and an effective amount of a crack growth resistant agent.

12. A methylenedianiline complex cured polyurethane according to claim 11, wherein said prepolymer is made by reacting a blend of polyether polyols with diphenylmethane diisocyanate, wherein said polyether blend contains from about 10% to about 70% by weight of (a) a poly(oxyalkylene) polyol and from about 30% to about 90% by weight of (b) a polyether polyol having ethylene oxide end blocks thereon based upon the total weight of said (a) and said (b) polyols.

13. A methylenedianiline complex cured polyurethane according to claim 12, wherein said oxyalkylene group of said (a) poly(oxyalkylene) polyol is an alkyl substituted oxyethylene unit, wherein said alkyl substituent has from 1 to 4 carbon atoms,
    wherein said (b) ethylene oxide end blocked polyether polyol contains alkyl substituted oxyethylene repeating units therein, wherein said alkyl substituent contains from 1 to 4 carbon atoms, and wherein said (b) ethylene oxide containing polyether polyol has from about 2% to about 60% by weight of ethylene oxide therein based upon the total weight of said (b) polyetherpolyol.

14. A methylenedianiline complex cured polyurethane according to claim 13, wherein the amount of said (a) poly(oxyalkylene) polyol is from about 30% to about 60% by weight based upon the total weight of said (a) and said (b) polyethe polyols, and wherein the amount of said (b) polyether polyol containing ethylene oxide units is from about 40% to about 70% by weight based upon the total weight of said (a) and (b) polyols.

15. A methylenedianiline complex cured polyurethane according to claim 14, wherein said crack growth resistant agent is glycerine, wherein said metal halide salt complex is sodium chloride, and wherein the amount of said free NCO groups is at least 5% by weight.

16. A methylenedianiline complex cured polyurethane according to claim 15, wherein the equivalent weight of said (a) poly(oxyalkylene) polyol and said (b) ethylene oxide containing polyetherpolyol is from about 200 to about 8,000 and wherein the effective amount of said glycerine is from about 0.05 parts to about 0.75 parts by weight based upon 100 parts by weight of said prepolymer.

17. A methylenedianiline complex cured polyurethane according to claim 16, wherein said alkyl substituent of said oxyethylene repeating units is methyl with regard to both said (a) poly(oxyalkylene) polyol and said (b) polyetherpolyol, and wherein said equivalent weight of said (a) and said (b) polyols is from about 500 to about 3,600.

18. A methylenedianiline complex cured polyurethane according to claim 15, wherein said (a) poly(oxyalkylene) polyol is poly(oxypropylene) diol, wherein said (b) ethylene oxide containing polyetherpolyol is poly(oxypropylene) diol and wherein the average number of said ethylene oxide units in each said end block is from about 1 to about 20, and wherein the amount of said free NCO groups is at least 5% by weight 19. A methylenedianiline complex cured polyurethane according to claim 17, wherein said (a) poly(oxyalkylene) polyol is poly(oxypropylene) diol wherein said (b) ethylene oxide containing polyetherpolyol is poly(oxypropylene) diol and wherein the average number of said ethylene oxide units in each said end block is from about 4 to about 10, and wherein the amount of said free NCO groups is at least 7% by weight.

* * * * *

UNITED STATES PATENT AND TRADEMARK OFFICE
CERTIFICATE OF CORRECTION

PATENT NO. : 4,774,313
DATED : SEPTEMBER 27, 1988
INVENTOR(S) : JOSEPH H. TAZEWELL

It is certified that error appears in the above-identified patent and that said Letters Patent are hereby corrected as shown below:

Column 3, line 46, "from about 60° 0" should be "from about 60° C"

Column 5, line 54, "diol or trio" should be "diol or triol"

Column 6, line 11, "diol to trio" should be "diol or triol"

Column 6, line 67, "(b) polyethe" should be "(b) polyether"

Signed and Sealed this

Twenty-eighth Day of February, 1989

*Attest:*

DONALD J. QUIGG

*Attesting Officer*     *Commissioner of Patents and Trademarks*